United States Patent
You et al.

(10) Patent No.: US 11,431,673 B2
(45) Date of Patent: Aug. 30, 2022

(54) METHOD, APPARATUS, AND SYSTEM FOR SELECTING MEC NODE

(71) Applicant: Tencent Technology (Shenzhen) Company Limited, Shenzhen (CN)

(72) Inventors: Zhiqiang You, Shenzhen (CN); Jiajia Lou, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 0 days.

(21) Appl. No.: 17/380,585

(22) Filed: Jul. 20, 2021

(65) Prior Publication Data

US 2021/0352042 A1 Nov. 11, 2021

Related U.S. Application Data (63) Continuation of application No. PCT/CN2020/086398, filed on Apr. 23, 2020.

(30) Foreign Application Priority Data

May 10, 2019 (CN) .......................... 201910387587.9

(51) Int. Cl.
*H04L 61/4511* (2022.01)
*H04L 67/02* (2022.01)
(Continued)

(52) U.S. Cl.
CPC .......... *H04L 61/4511* (2022.05); *H04L 67/02* (2013.01); *H04L 67/1001* (2022.05); *H04L 67/561* (2022.05); *H04L 67/568* (2022.05)

(58) Field of Classification Search
None
See application file for complete search history.

(56) References Cited

U.S. PATENT DOCUMENTS

| 6,119,143 A * | 9/2000 | Dias ..................... H04L 61/1511 |
| | | 712/30 |
| 7,970,876 B2 * | 6/2011 | Sadot .................. H04L 67/1017 |
| | | 709/227 |

(Continued)

FOREIGN PATENT DOCUMENTS

| CN | 109640319 A | 4/2019 |
| CN | 110198307 A | 9/2019 |

(Continued)

OTHER PUBLICATIONS

International Search Report and Written Opinion with English Translation for International Patent Application No. PCT/CN2020/086398 dated Jul. 14, 2020; 9 pages.

(Continued)

*Primary Examiner* — Lashonda Jacobs-Burton
(74) *Attorney, Agent, or Firm* — Crowell & Moring LLP (57) ABSTRACT

This application relates to the field of mobile communication, and in particular, to a method, an apparatus, and a system for selecting MEC node. The method includes: receiving a domain name request initiated by a terminal forwarded by the UPF, the domain name request comprising at least one of: a domain name, a destination address, or a protocol port information; obtaining a corresponding edge-application VIP from the GSLB based on the domain name request; returning a domain name response to the terminal, the domain name response comprising the edge-application VIP; receiving a service request initiated from the terminal forwarded by the UPF, a destination address of the service request being the edge-application VIP; and determining a corresponding MEC processing server according to the service request and a preset offloading policy, and offloading the service request to the corresponding MEC processing server.

20 Claims, 5 Drawing Sheets

(51) Int. Cl.
    *H04L 67/561*     (2022.01)
    *H04L 67/568*     (2022.01)
    *H04L 67/1001*     (2022.01)

(56) References Cited

U.S. PATENT DOCUMENTS

| | | | |
|---|---|---|---|
| 10,516,608 B2* | 12/2019 | Biancaniello | H04L 45/74 |
| 10,812,381 B2* | 10/2020 | Biancaniello | H04L 67/42 |
| 11,257,361 B2* | 2/2022 | Chang | G08G 1/052 |
| 11,258,873 B2* | 2/2022 | Mueck | H04L 67/2804 |
| 2002/0138660 A1* | 9/2002 | Eilers | G06F 9/5055 |
| | | | 719/313 |
| 2016/0080259 A1* | 3/2016 | Biancaniello | H04L 67/1002 |
| | | | 709/203 |
| 2019/0021033 A1* | 1/2019 | Liu | H04W 36/08 |
| 2019/0138934 A1 | 5/2019 | Prakash et al. | |
| 2019/0199790 A1* | 6/2019 | Yang | H04L 67/1008 |
| 2020/0220810 A1* | 7/2020 | Yu | H04L 65/1036 |
| 2020/0274942 A1* | 8/2020 | Mueck | H04L 67/12 |
| 2020/0389531 A1* | 12/2020 | Lee | H04L 61/1511 |
| 2021/0076250 A1* | 3/2021 | Wang | H04W 72/087 |
| 2021/0243264 A1* | 8/2021 | Yoon | H04L 41/0813 |
| 2021/0352042 A1* | 11/2021 | You | H04L 67/2804 |
| 2022/0052961 A1* | 2/2022 | Chauhan | H04L 47/82 |

FOREIGN PATENT DOCUMENTS

| | | |
|---|---|---|
| CN | 110198363 A | 9/2019 |
| CN | 110769039 A | 2/2020 |

OTHER PUBLICATIONS

Extended European Search Report for European Patent Application No. 20806492.3 dated Jun. 2, 2022, 11 pgs.
Fabio Giust et al., "ETSI White Paper No. 24, MEC Deployments in 4G and Evolution Towards 5G", First Edition—Feb. 2018, pp. 1-24.

\* cited by examiner

METHOD, APPARATUS, AND SYSTEM FOR SELECTING MEC NODE

RELATED APPLICATION

This application is a continuation application of the International PCT Application No. PCT/CN2020/086398, filed with the China National Intellectual Property Administration, PRC on Apr. 23, 2020 which claims priority to Chinese Patent Application No. 201910387587.9, filed with the China National Intellectual Property Administration, PRC on May 10, 2019, each of which is incorporated herein by reference in their entireties.

FIELD OF THE TECHNOLOGY

This application relates to the field of mobile communication, and in particular, to mobile edge computing (MEC) node selection.

BACKGROUND OF THE APPLICATION

With the development of science and technology, currently, users have higher requirements for processing and transmission rates of communication services. Particularly, for a fifth-generation mobile communication technology (5G) mobile communication network, requirements for a processing speed are higher. In MEC, computing, storage, and processing capabilities can be provided by using a nearby mobile access network, to reduce latency. Therefore, a mobile terminal needs to be scheduled to a MEC node closest to the mobile terminal.

SUMMARY

Embodiments of this disclosure provide a method, an apparatus, and a system for selecting a MEC node, to resolve the problem of absence of a MEC node selection solution for a 5G mobile communication network in the related art.

The embodiments of this disclosure provide the following technical solutions:

According to an aspect, an embodiment of this disclosure provides a method for selecting a MEC node, performed by an edge cloud gateway, the edge cloud gateway being configured in a system for selecting a MEC node, the system including at least a user plane function (UPF), the edge cloud gateway, and a global server load balance (GSLB) entity, the method specifically including:

receiving, by the edge cloud gateway, a domain name request forwarded by the UPF, in the domain name request, a domain name being a preset service acceleration domain name, or a destination address being an IP address of the GSLB, or protocol port information in the domain name request meeting a preset protocol port requirement;

obtaining a corresponding edge-application virtual Internet Protocol address (VIPA, or VIP) from the GSLB based on the domain name request;

returning a domain name response to a terminal by using the UPF, the domain name response including at least the edge-application VIP;

receiving a service request forwarded by the UPF, a destination address of the service request being the edge-application VIP; and determining a corresponding MEC processing server according to the service request and a preset offloading policy, and offloading the service request to the corresponding MEC processing server.

According to an aspect, an embodiment of this disclosure provides an edge cloud gateway for selecting a MEC node, the edge cloud gateway being configured in a system for selecting a MEC node, the system including at least a UPF, the edge cloud gateway, and a GSLB, specifically including:

a first receiving module, configured to receive a domain name request forwarded by the UPF, in the domain name request, a domain name being a preset service acceleration domain name, or a destination address being an IP address of the GSLB, or protocol port information in the domain name request meeting a preset protocol port requirement;

an obtaining module, configured to obtain a corresponding edge-application VIP from the GSLB based on the domain name request;

a transmitting module, configured to return a domain name response to a terminal by using the UPF, the domain name response including at least the edge-application VIP;

a second receiving module, configured to receive a service request forwarded by the UPF, a destination address of the service request being the edge-application VIP;

a determining module, configured to determine a corresponding MEC processing server according to the service request and a preset offloading policy; and an offloading module, configured to offload the service request to the corresponding MEC processing server.

In one implementation, a recording module is further included, and is configured to record a request type of the domain name request, the request type representing a DNS request or a first HTTP DNS request.

In one implementation, the obtaining module is specifically configured to:

transmit a second HTTP DNS request to the GSLB based on the domain name request, the second HTTP DNS request including at least a service acceleration domain name, a source address, and a destination address, the source address being an IP address of the edge cloud gateway, and the destination address being an IP address of the GSLB; and receive a first HTTP DNS response returned by the GSLB, the first HTTP DNS response including at least the edge-application VIP, the edge-application VIP being determined by the GSLB according to the IP address of the edge cloud gateway and the service acceleration domain name.

In one implementation, when in the domain name request, the protocol port information meets the preset protocol port requirement, or the destination address is the IP address of the GSLB, the obtaining module is specifically configured to:

resolve, when the request type of the domain name request is the DNS request, the domain name request to obtain the domain name in the domain name request, and re-encapsulate the resolved domain name request into a second HTTP DNS request; and transmit the re-encapsulated second HTTP DNS request to the GSLB.

In one implementation, the transmitting module is specifically configured to:

return a DNS response when the request type of the domain name request is the DNS request; and return a second HTTP DNS response when the request type of the domain name request is the first HTTP DNS request.

In one implementation, the UPF, the edge cloud gateway, and the GSLB respectively correspond to different pre-configuration rules, the pre-configuration rule representing a routing configuration for service acceleration.

In one implementation, the UPF corresponds to a first pre-configuration rule, the first pre-configuration rule including at least: forwarding the domain name request in which the domain name is the preset service acceleration domain name to the edge cloud gateway; or forwarding the domain name request in which the destination address is the IP address of the GSLB to the edge cloud gateway; or forwarding the service request in which the destination address is the edge-application VIP to the edge cloud gateway.

The edge cloud gateway corresponds to a second pre-configuration rule, the second pre-configuration rule including at least: the preset offloading policy.

The GSLB corresponds to a third pre-configuration rule, the third pre-configuration rule including at least: for an HTTP DNS request in which a source address is the IP address of the edge cloud gateway, returning a corresponding edge-application VIP based on the IP address of the edge cloud gateway and a service acceleration domain name in the HTTP DNS request.

In one implementation, the UPF corresponds to a fourth pre-configuration rule, the fourth pre-configuration rule including at least: forwarding the domain name request in which the protocol port information meets the preset protocol port requirement to the edge cloud gateway; or forwarding the domain name request in which the destination address is the IP address of the GSLB to the edge cloud gateway; or forwarding the service request in which the destination address is the edge-application VIP to the edge cloud gateway.

The edge cloud gateway corresponds to a fifth pre-configuration rule, the fifth pre-configuration rule including at least: the preset offloading policy, and has a DNS request resolving capability.

In one implementation, the first pre-configuration rule, the second pre-configuration rule, the fourth pre-configuration rule, or the fifth pre-configuration rule is configured by a configured edge controller or is locally configured, the edge controller being configured in a cloud center of a core network in the system, and being communicably connected to the edge cloud gateway and the UPF respectively.

According to another aspect, an embodiment of this disclosure provides a system for selecting a MEC node, including at least a UPF, an edge cloud gateway, and a GSLB, specifically:

the UPF being configured to receive a domain name request transmitted by a terminal, and forward the domain name request to the edge cloud gateway when it is determined that in the domain name request, a domain name is a preset service acceleration domain name, or a destination address is an IP address of the GSLB, or when it is determined that protocol port information in the domain name request meets a preset protocol port requirement; and the edge cloud gateway being configured to obtain a corresponding edge-application VIP from the GSLB based on the domain name request;

return a domain name response to a terminal by using the UPF, the domain name response including at least the edge-application VIP;

receive a service request forwarded by the UPF, the service request being forwarded when a destination address that is in the service request transmitted by the terminal and that is obtained by the UPF through resolution is the edge-application VIP; and determine a corresponding MEC processing server according to the service request and a preset offloading policy, and offload the service request to the corresponding MEC processing server.

Another embodiment of this disclosure provides an electronic device, including a memory, a processor, and a computer program stored in the memory and executable on the processor, the processor, when executing the program, performing the method for selecting a MEC node according to the foregoing aspect.

According to another aspect, an embodiment of this disclosure provides a non-transitory storage medium, configured to store a computer program, the computer program being configured to perform the method for selecting a MEC node according to the foregoing aspect.

According to another aspect, an embodiment of this disclosure provides a computer program product including instructions, the instructions, when run on a computer, causing the computer to perform the method for selecting a MEC node according to the foregoing aspect.

The technical solutions provided in the embodiments of this disclosure include at least the following beneficial effects:

A method for selecting a MEC node is provided, performed by an edge cloud gateway, the edge cloud gateway being configured in a system for selecting a MEC node, the system including at least a UPF, the edge cloud gateway, and a GSLB. For a domain name request transmitted by a terminal, the domain name request may be a DNS request or an HTTP DNS request. The UPF can analyze and process the domain name request, and forward the domain name request to the edge cloud gateway when service acceleration is required. Further, the edge cloud gateway performs processing, and may obtain an edge-application VIP from the GSLB, and transmit the edge-application VIP to the terminal by using the UPF, to make the terminal transmit a service request in which a destination address is the edge-application VIP, and offload the service request from the terminal to a corresponding MEC processing server. In this way, an edge cloud gateway is added, and compatibility with DNS and HTTP DNS addressing scenarios is achieved by transforming an existing network access procedure. Application scenarios are more flexible, a mechanism for selecting a MEC node is implemented, and the problem of absence of a MEC node selection solution for a 5G mobile communication networks is resolved, so that a nearby edge computing node can be selected for edge acceleration.

DESCRIPTION OF EMBODIMENTS

The following clearly and completely describes the technical solutions in embodiments of this disclosure with reference to the accompanying drawings in the embodiments of this disclosure. Apparently, the described embodiments are some of the embodiments of this disclosure rather than all of the embodiments. All other embodiments obtained by a person of ordinary skill in the art based on the embodiments of this disclosure without creative efforts shall fall within the protection scope of this application.

Content delivery network (CDN): A basic idea of the CDN is to avoid, as many as possible, bottlenecks and links on the Internet that may affect a speed and a stability of data transmission, so that content transmission is faster and more stable, and provide nearby access to the CDN for acceleration. The acceleration may include computing acceleration and transmission acceleration.

Domain name system (DNS): As a distributed database that can map a domain name and an Internet Protocol (IP) address to each other, the DNS spares users the trouble of memorizing IP address data strings that can be directly read by a machine, so that it is easier for users to access the Internet.

User plane function (UPF): The UPF is an entity which is responsible for user plane processing.

Global server load balance (GSLB): The GSLB is an entity which implements traffic distribution between servers in different regions on a wide area network including the Internet, and directs a user request to the nearest node (or region) to ensure access quality.

Mobile edge computing (MEC): The MEC is a technology that deeply integrates the mobile access network with the Internet service based on the 5G evolution architecture. The MEC, by using a wireless access network nearby, provides services and cloud computing functions required by the Internet technology (IT) for telecommunication users, to create a carrier-class service environment with high performance, low latency, and high bandwidth, accelerate rapid download of various content, services, and applications in the network, and allow consumers to experience an uninterrupted high-quality network.

Virtual IP (VIP): The VIP is an IP address that does not link to a specific computer or a network interface controller (NIC) in a computer. Packets are transmitted to this VIP address, but all data still passes through a real network interface.

Edge-application VIP: The edge-application VIP indicates a virtual IP that provides local acceleration for an application.

At present, the gradual development of the 5G mobile communication network leads to higher requirements for processing and transmission rates of communication services. The MEC can provide computing, storage, processing capabilities, and the like by using a mobile access network nearby to reduce latency. However, how to schedule (or assign) a mobile terminal to a MEC node closest to the mobile terminal is an urgent problem that needs to be resolved. 5G is a cutting-edge technology, where there are relatively few related researches. There is no relevant solution for how to select a MEC node in a 5G mobile communication network.

Figure 1:
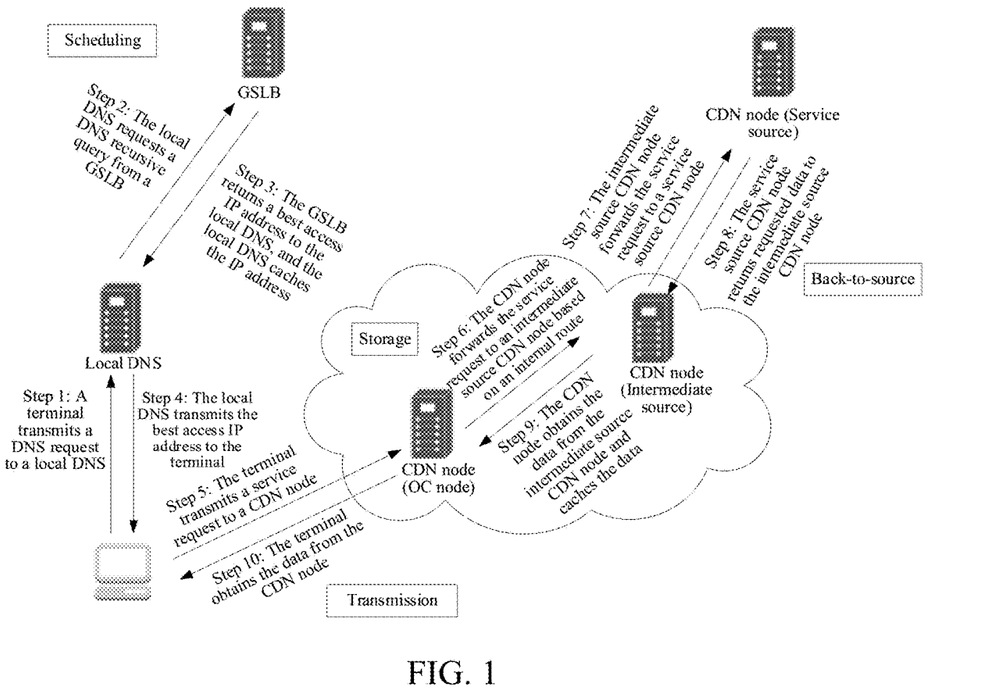
FIG. 1 is a schematic flowchart of a CDN scheduling method in related art.

In addition, the conventional DNS addressing mechanism in the related art is similar to determining a corresponding IP address for data transmission. FIG. 1 is a schematic flowchart of a CDN scheduling method in related art, the method including the following steps:

Step 1: A terminal transmits a DNS request to a local DNS.

Step 2: The local DNS requests a DNS recursive query from a GSLB.

Step 3: The GSLB returns a best access IP address to the local DNS, and the local DNS caches the IP address.

Step 4: The local DNS transmits the best access IP address to the terminal.

Step 5: The terminal transmits a service request to a CDN node.

The CDN node includes an edge node which may be an outer center (OC).

Step 6: The CDN node forwards the service request to an intermediate source CDN node based on an internal route.

Step 7: The intermediate source CDN node forwards the service request to a service source CDN node.

Step 8: The service source CDN node returns requested data to the intermediate source CDN node.

Step 9: The CDN node obtains the data from the intermediate source CDN node and caches the data.

Step 10: The terminal obtains the data from the CDN node.

In the related art, this scheduling method is to position a location of the terminal by using the IP address allocated by an operator, to schedule the terminal to the nearest CDN node. However, the IP positioning technology has large deviations and low precision. For example, the positioning technology may only reach a provincial or state level. However, there are many MEC nodes in this region. Consequently, precision requirements of the MEC nodes cannot be met, that is, the terminal may not be scheduled to the nearest MEC node.

Therefore, in the embodiments of this disclosure, a method for selecting a MEC node is provided to at least solve this precision issue in a 5G mobile communication network, and the method is compatible with a standard DNS and a HyperText Transport Protocol (HTTP) DNS. During standard DNS and HTTP DNS addressing processes of an application of the terminal, an existing network access procedure is transformed without being perceived by the application of the terminal (i.e., transparent to the application), for accessing an edge computing node nearby, thereby achieving service acceleration. In some implementations, the standard DNS may be considered as a DNS not associated with HTTP.

Figure 2:
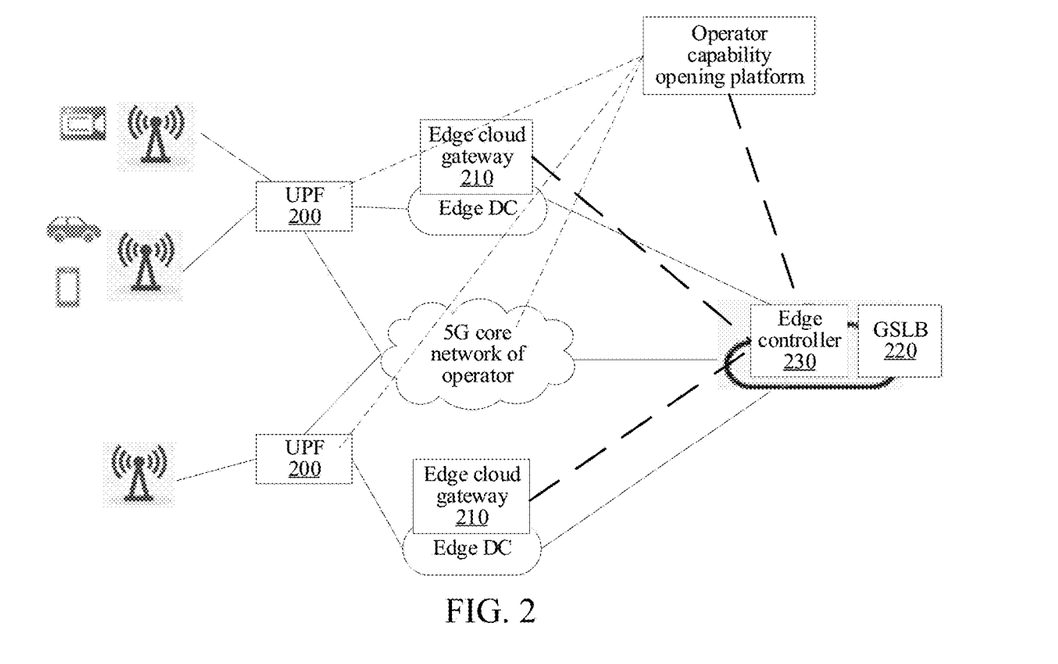
FIG. 2 is a schematic architectural diagram of an exemplary system for selecting a MEC node according to an embodiment of this disclosure.

FIG. 2 is an architectural diagram of a system for selecting a MEC node according to an embodiment of this disclosure. At least a UPF 200, an edge cloud gateway 210, and a GSLB 220 are included, and an edge controller 230 is further included.

In this embodiment of this disclosure, in a network architecture layout, a data channel can connect a central cloud and an edge cloud of a core network of an operator, and to offload data to an edge computing node, the edge cloud gateway 210 and the edge controller 230 are added. The edge cloud gateway 210 is configured on a MEC node side or an edge data center (DC) side, and the edge controller 230 is configured on a central cloud of the core network and communicably connected to the edge cloud gateway 210 and the UPF 200 respectively. The GSLB 220 is also deployed on the central cloud side of the core network, and is a parallel device with the edge controller 230. In addition, the UPF 200, the edge cloud gateway 210, and the GSLB 220 respectively correspond to different pre-configuration rules. The pre-configuration rule represents a routing configuration for service acceleration.

1) The edge controller 230 is mainly responsible for scheduling of global service traffic, and controls the scheduling of service traffic to the edge cloud gateway 210. Then, the edge cloud gateway 210 schedules the service traffic to a specific local MEC processing server, including:

a. Connect to an operator capability opening platform (e.g., the operator platform which is open to MEC), and pre-configure the UPF 200 and the edge cloud gateway 210 when an edge service is deployed.

Specifically, the edge controller 230 is configured to respectively configure a first pre-configuration rule and a fourth pre-configuration rule of the UPF 200, and a second pre-configuration rule and a fifth pre-configuration rule of the edge cloud gateway 210. The foregoing configuration rules are described in detail in the following embodiments.

For example, as shown in FIG. 2, the edge controller 230 may pre-configure the UPF 200 by using the operator capability opening platform and a 5G core network of the operator.

b. Dynamically collect user location information from a 5G core network side of the operator, and select nearby edge computing nodes for hosting services, the hosting services representing services that require edge computing in the 5G mobile communication network, that is, services that require service acceleration.

c. Connect to a cloud infrastructure-as-a-service (IaaS) or platform-as-a-service (PaaS) controller to control edge DC resources.

The IaaS and PaaS are not shown in FIG. 2. In practice, the IaaS and PaaS may be located between the edge cloud gateway 210 and the edge controller 230. Mainly, the edge controller 230 can monitor a load status of the edge cloud gateway 210 through the IaaS and PaaS, and control load scheduling of the edge cloud gateway 210.

2) For the GSLB 220, when an edge service is deployed, the GSLB 220 also needs to be pre-configured. Specifically, the GSLB 220 corresponds to a third pre-configuration rule, where the third pre-configuration rule includes at least the following:

a. For an HTTP DNS request in which a source address is the IP address of the edge cloud gateway 210, return a corresponding edge-application VIP based on the IP address of the edge cloud gateway 210 and the service acceleration domain name in the HTTP DNS request.

For example, when receiving the second HTTP DNS request transmitted by the edge cloud gateway 210, the GSLB 220 returns the first HTTP DNS response to the edge cloud gateway 210. The second HTTP DNS request includes at least a service acceleration domain name, a source address, or a destination address, the source address being an IP address of the edge cloud gateway 210, and the destination address being an IP address of the GSLB 220. The first HTTP DNS response includes at least the edge-application VIP, the edge-application VIP being determined by the GSLB 220 according to the IP address of the edge cloud gateway 210 and the service acceleration domain name. In some implementations, the HTTP DNS request may be a DNS request embedded in the HTTP request, or the DNS request is made via HTTP protocol, and a standard DNS request may be a DNS request not associated with an HTTP request. In this disclosure, a DNS request, if not prefixed with "HTTP", may be referred to as a standard DNS request.

b. For the GSLB 220, alternatively, manually add an intervention method to return configured IP addresses for different source addresses in the HTTP DNS request.

3) For the UPF 200, in this embodiment of this disclosure, the UPF 200 needs to be pre-configured. A pre-configuration function represents a routing configuration for service acceleration. The UPF 200 needs to provide a routing configuration function. The UPF 200 corresponds to the first pre-configuration rule or the fourth pre-configuration rule.

The first pre-configuration rule includes at least:

a. Forward the domain name request to the edge cloud gateway 210 when the domain name is the preset service acceleration domain name.

In an embodiment of this disclosure, the domain name request transmitted by the terminal may be a standard DNS request or a first HTTP DNS request, which is not limited in this embodiment of this disclosure.

This rule is mainly for a domain name request of which a request type is a DNS request. The UPF 200 may resolve the DNS request to check a domain name in the DNS request. That is, in the first pre-configuration rule, the UPF 200 may have a function of resolving or parsing a DNS request to check a domain name in the DNS request, thereby forwarding the domain name request to the edge cloud gateway 210.

b. Forward the domain name request in which the destination address is the IP address of the GSLB 220 to the edge cloud gateway 210.

In the first pre-configuration rule of the UPF 200, a and b are for domain name requests transmitted by the terminal. After the UPF 200 receives the domain name requests transmitted by the terminal, for a domain name request of which a request type is a DNS request, the UPF 200 may resolve the DNS request to check the domain name, and for a domain name request of which a request type is a first HTTP DNS request, the UPF 200 may check a destination address.

Specifically, the UPF 200 is configured to receive the domain name request transmitted by the terminal, and forward the domain name request to the edge cloud gateway 210 if it is determined that in the domain name request, a domain name is a preset service acceleration domain name, or a destination address is an IP address of the GSLB 220.

c. Forward the service request in which the destination address is the edge-application VIP to the edge cloud gateway 210.

Specifically, the UPF 200 is configured to receive the service request transmitted by the terminal, and forward the service request to the edge cloud gateway 210 if it is determined that a destination address in the service request is the edge-application VIP.

The fourth pre-configuration rule includes at least:

a. Forward the domain name request in which the protocol port information meets the preset protocol port requirement to the edge cloud gateway 210.

In an embodiment of this disclosure, the UPF 200 in the fourth pre-configuration rule does not have the function of resolving a domain name request of which a request type is a DNS request, and the resolution is mainly performed by the edge cloud gateway 210. Therefore, after the UPF 200 receives the domain name request transmitted by the terminal in the fourth pre-configuration rule, the UPF 200 may only check protocol port information or a destination address of the domain name request.

For a domain name request of which a request type is a DNS request, checking protocol port information is mainly checking protocol port information of the DNS request. For example, a preset protocol port is required to be a user datagram protocol (UDP) port 53. If it is determined that the protocol port information is the UDP port 53, indicating that the domain name request is a DNS request, the domain name request is forwarded to the edge cloud gateway 210, so that the edge cloud gateway 210 subsequently obtains a domain name by implementing a corresponding DNS request resolving capability, to determine whether acceleration is needed.

b. Forward the domain name request in which the destination address is the IP address of the GSLB 220 to the edge cloud gateway 210.

Specifically, the UPF 200 is configured to receive the domain name request transmitted by the terminal, and forward the domain name request to the edge cloud gateway 210 if it is determined that in the domain name request, the protocol port information meets a preset protocol port requirement, or a destination address is an IP address of the GSLB 220.

c. Forward the service request in which the destination address is the edge-application VIP to the edge cloud gateway 210.

The first pre-configuration rule or the fourth pre-configuration rule may be configured by the edge controller 230 which is provisioned to configure the rules, or configured locally. That is, the UPF 200 not only can be configured and managed by the edge controller 230 in a unified manner, but also can be configured and loaded locally, which is not limited in this embodiment of this disclosure.

4) The edge cloud gateway 210 is mainly configured for intelligent scheduling, load balancing, statistical analysis, and the like for local traffic, that is, traffic within a geographical range for which the edge cloud gateway 210 is responsible, to schedule service traffic to a specific MEC processing server. In this embodiment of this disclosure, when an edge service is deployed, the edge cloud gateway 210 also needs to be pre-configured. Specifically, the edge cloud gateway 210 corresponds to the second pre-configuration rule or the fifth pre-configuration rule.

The second pre-configuration rule includes a preset offloading policy.

For example, the preset offloading policy is to perform offloading based on IP 5-tuple information. For example, an IP 5-tuple includes a source IP address, a destination IP address, a protocol number, a source port, and a destination port, and the offloading can be performed based on a load balancing algorithm. For example, the load balancing algorithm includes source address hashing. The source IP address is hashed, and a hash value is obtained through the hash calculation. Based on the hash value and configuration rules of a MEC processing server list, a corresponding MEC processing server is determined, and further, the service request is forwarded to the corresponding MEC processing server for processing.

In another example, the preset offloading policy is to perform offloading based on uniform resource locator (URL) information. For example, the service request may be forwarded to a MEC processing server that processes a corresponding service type according to a service type of the domain name request in the service request, and a specific domain name or resource type stored or configured on each MEC processing server, for example, a specific domain name or resource type representing a service type of processing an image or video. For example, there is a correspondence between the MEC processing server and a service type, a specific MEC processing server handles a particular service type. In some implementations, the offloading may be based on both the aforementioned hash algorithm and the URL information.

The specific offloading policy is not limited in this embodiment of this disclosure, and may be selected and used according to actual requirements.

The fifth pre-configuration rule includes at least: the preset offloading policy. In addition, the edge cloud gateway 210 has a DNS request resolving capability.

That is, in the two pre-configuration rules of the edge cloud gateway 210, compared with the second pre-configuration rule, the fifth pre-configuration rule enables the edge cloud gateway 210 to resolve a standard DNS request. Therefore, the edge cloud gateway 210 can resolve a DNS message, obtain a carried domain name, and then re-encapsulate the resolved DNS message into a corresponding second HTTP DNS request.

The second pre-configuration rule or the fifth pre-configuration rule is configured by the edge controller 230 which is provisioned to configure the rules, or configured locally. That is, the edge cloud gateway 210 not only can be configured and managed by the edge controller 230 in a unified manner, but also can be configured and loaded locally, which is not limited in this embodiment of this disclosure.

In addition, the pre-configuration rule of the edge cloud gateway 210 corresponds to the pre-configuration rule of the UPF 200. After the UPF 200 receives the domain name request transmitted by the terminal, if the UPF 200 performs corresponding actions based on the corresponding first pre-configuration rule, that is, resolves the domain name or the destination address and further forwards the domain name request to the edge cloud gateway 210, and then the edge cloud gateway 210 performs corresponding actions based on the second pre-configuration rule, and may directly encapsulate the domain name request into a second HTTP DNS request based on information such as the domain name, and transmit the second HTTP DNS request to the GSLB 220. If the UPF 200 performs corresponding actions based on the fourth pre-configuration rule, that is, only checks protocol port information or a destination address without performing resolution, and then forwards the protocol port information or the destination address to the edge cloud gateway 210, then the edge cloud gateway 210 performs corresponding actions based on the fifth pre-configuration rule. That is, if the domain name request is a DNS request, the edge cloud gateway 210 resolves the DNS request first, then encapsulates the DNS request into a second HTTP DNS request, and transmits the second HTTP DNS request to the GSLB 220. For the two implementations, no limitation is imposed in this embodiment of this disclosure.

Specifically, the edge cloud gateway 210 is configured to:

S1: Obtain a corresponding edge-application VIP from the GSLB 220 based on the domain name request.

The edge cloud gateway 210 may be further configured to record a request type of the domain name request, the request type representing a DNS request (e.g., a standard DNS request not associated with HTTP) or a first HTTP DNS request.

That is, in this embodiment of this disclosure, the terminal can be supported to initiate a domain name request for an original domain name by using the standard DNS or the first HTTP DNS request, where a destination address of the domain name request is an IP address of GSLB 220.

When S1 is performed, the edge cloud gateway 210 is specifically configured to:

S1.1: Transmit a second HTTP DNS request to the GSLB 220 based on the domain name request, the second HTTP DNS request including at least a service acceleration domain name, a source address, and a destination address, the source address being an IP address of the edge cloud gateway 210, and the destination address being an IP address of the GSLB 220.

Specifically, there may be two cases when step S1.1 is performed:

In the first case: In the domain name request, a domain name is a preset service acceleration domain name, or a destination address is the IP address of GSLB 220.

That is, the pre-configuration rule of the UPF 200 is the first pre-configuration rule. The UPF 200 can resolve a domain name request of which a request type is a DNS request, and obtain a domain name in the DNS request. Regardless of whether the domain name request transmitted by the terminal is a DNS request or a first HTTP DNS request, after receiving the domain name request transmitted by the UPF 200, the edge cloud gateway 210 is specifically configured to re-encapsulate, based on the domain name request, the domain name request into a second HTTP DNS request by using the IP address thereof as a source address, and forward the second HTTP DNS request to the GSLB 220.

That is, in the first case, for the first pre-configuration rule corresponding to the UPF 200, the UPF 200 has a DNS request resolving capability, and the edge cloud gateway 210 corresponds to the second pre-configuration rule, that is, after the edge cloud gateway 210 receives the domain name request, the edge cloud gateway 210 does not resolve the domain name request that is a DNS request.

In the second case: In the domain name request, the protocol port information meets the preset protocol port requirement, or the destination address is the IP address of the GSLB 220.

The edge cloud gateway 210 is specifically configured to resolve, if the request type of the domain name request is the DNS request, the domain name request to obtain the domain name in the domain name request, re-encapsulates the resolved domain name request into a second HTTP DNS request, and transmits the re-encapsulated second HTTP DNS request to the GSLB 220.

That is, the second case is for the fourth pre-configuration rule corresponding to the UPF 200. The UPF 200 does not have a DNS request resolving capability. After the domain name request is transmitted to the edge cloud gateway 210, where the edge cloud gateway 210 corresponds to the fifth pre-configuration rule and the edge cloud gateway 210 has a DNS request resolving capability, the edge cloud gateway 210 resolves a domain name request of which a request type is a DNS request, re-encapsulates the domain name request into a second HTTP DNS request, and transmits the second HTTP DNS request to the GSLB 220.

In addition, if the request type of the domain name request is a first HTTP DNS request, although the edge cloud gateway 210 does not need to resolve the domain name request, the edge cloud gateway 210 still needs to re-encapsulate the domain name request, for example, change the source address to an IP address of the edge cloud gateway 210 itself, and then transmits the re-encapsulated domain name request to the GSLB 220.

S1.2: Receive a first HTTP DNS response returned by the GSLB 220, the first HTTP DNS response including at least the edge-application VIP, the edge-application VIP being determined by the GSLB 220 according to the IP address of the edge cloud gateway 210 and the service acceleration domain name.

S2: Return a domain name response to a terminal by using the UPF 200, the domain name response including at least the edge-application VIP.

When S2 is performed, the edge cloud gateway 210 is specifically configured to:

return a DNS response when the request type of the domain name request is the DNS request; and return a second HTTP DNS response when the request type of the domain name request is the first HTTP DNS request.

In this embodiment of this disclosure, after receiving the first HTTP DNS response returned by the GSLB 220, the edge cloud gateway 210 needs to return a corresponding response packet to the terminal by using the UPF 200 according to the request type of the domain name request transmitted by the terminal. That is, if the request type of the domain name request transmitted by the terminal is a DNS request, a standard DNS response packet needs to be encapsulated and returned to the UPF 200; and if the request type of the domain name request transmitted by the terminal is a first HTTP DNS request, a second HTTP DNS response packet needs to be encapsulated and returned to the UPF 200. Then, the UPF 200 transmits the received response packet to the terminal.

S3: Receive a service request initiated from the terminal and forwarded by the UPF 200, the service request being forwarded when the UPF 200 obtains through resolution that a destination address in the service request is the edge-application VIP.

S4: Determine a corresponding MEC processing server according to the service request and a preset offloading policy and offload the service request to the corresponding MEC processing server.

In this way, in the embodiments of this disclosure, compatibility with standard DNS and HTTP DNS addressing mechanisms can be achieved. An edge cloud gateway and an edge controller are added. A terminal can initiate a domain name request for an original domain name by using a standard DNS request or a first HTTP DNS request, and forward the domain name request that requires service acceleration to the edge cloud gateway. If the domain name request transmitted by the terminal is a DNS request, a UPF can be configured to resolve the DNS request. Alternatively, the edge cloud gateway may be configured to have a DNS request resolving capability, so that the edge cloud gateway can process the DNS request. The edge cloud gateway obtains an edge-application VIP from a GSLB, transmits the edge-application VIP to the terminal via the UPF, so the terminal may transmit a service request based on the edge-application VIP, and offload the service request of the terminal to a specific MEC processing server. Because the edge cloud gateway is at the edge of the system and is closer to the terminal, and, the original DNS request can be converted into an HTTP DNS request by using the edge cloud gateway, so that a local DNS can be bypassed and an access procedure can be simplified. Therefore, a processing rate is higher, and the latency is reduced. The edge cloud gateway can be applied to a DNS or HTTP DNS addressing scenario, so that a nearby edge computing node can be selected correctly, thereby achieving edge acceleration. In addition, in the framework of the related art, various over-the-top (OTT) services can be provided for users through the Internet, and a MEC node can be smoothly accessed without transformation, which is not perceived by the users, thereby improving the ease of implementation and user experience. Furthermore, in some implementations, a transformation or mapping from the original domain name to an edge-application VIP is performed to facilitate the service acceleration. An accurate service allocation is achieved as the allocation decision is made right at the edge close to the terminal.

Figure 3:
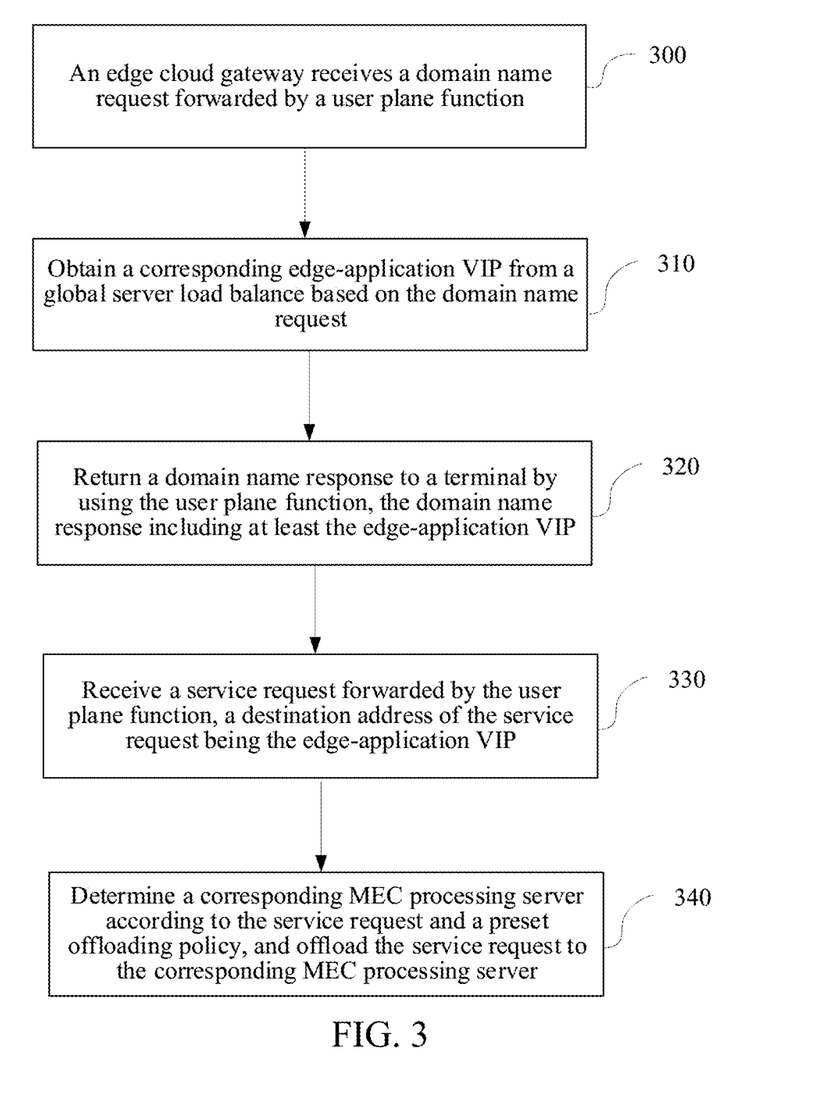
FIG. 3 is a flowchart of a method for selecting a MEC node according to an embodiment of this disclosure.

Based on the architectural diagram of the system shown in FIG. 2 in the foregoing embodiment, FIG. 3 is a flowchart of a method for selecting a MEC node according to an embodiment of this disclosure. The method is mainly applied to an edge cloud gateway, the method including:

Step 300: An edge cloud gateway receives a domain name request initiated from the terminal and forwarded by a UPF.

The domain name request is forwarded when the UPF obtains through resolution that in the domain name request transmitted by the terminal, a domain name is a preset service acceleration domain name, or a destination address is an IP address of the GSLB. Alternatively, the domain name request is forwarded when the UPF can determine that in the domain name request transmitted by the terminal, protocol port information meets the preset protocol port requirement, or a destination address is the IP address of the GSLB.

The method may further include: recording a request type of the domain name request, the request type representing a DNS request or a first HTTP DNS request.

In this embodiment of this disclosure, for the domain name request transmitted by the terminal, when the domain name request is forwarded to the edge cloud gateway, based on different configuration rules of the UPF and the edge cloud gateway, two possible implementations are provided, specifically:

In the first implementation: The UPF corresponds to the first pre-configuration rule, the edge cloud gateway corresponds to the second pre-configuration rule, and the GSLB corresponds to the third pre-configuration rule, that is, the UPF may be enabled to resolve the DNS request.

The UPF receives the domain name request transmitted by the terminal, if the request type of the domain name request is a DNS request, resolves the domain name request transmitted by the terminal, and forwards the domain name request to the edge cloud gateway when it is determined that the domain name is a preset service acceleration domain name, and if the request type of the domain name request is a first HTTP DNS request, forwards the domain name request to the edge cloud gateway when it is determined that the destination address of the domain name request is the IP address of the GSLB.

In the second implementation: The UPF corresponds to the fourth pre-configuration rule, the edge cloud gateway corresponds to the fifth pre-configuration rule, and the GSLB corresponds to the third pre-configuration rule, that is, the edge cloud gateway may be enabled to resolve the DNS request.

The UPF receives the domain name request transmitted by the terminal, if the request type of the domain name request is a DNS request, forwards the domain name request to the edge cloud gateway when it is determined that protocol port information in the domain name request meets the preset protocol port requirement, and if the request type of the domain name request is a first HTTP DNS request, forwards the domain name request to the edge cloud gateway when it is determined that the destination address of the domain name request is the IP address of the GSLB.

Step 310: Obtain a corresponding edge-application VIP from a GSLB based on the domain name request.

When step 310 is performed, the following steps are included:

S1: Transmit a second HTTP DNS request to the GSLB based on the domain name request, the second HTTP DNS request including at least a service acceleration domain name, a source address, and a destination address, the source address being an IP address of the edge cloud gateway, and the destination address being an IP address of the GSLB.

Based on the two implementations described in step 300, when S1 is performed, there may also be the following two implementations correspondingly:

In the first implementation: The UPF corresponds to the first pre-configuration rule, the edge cloud gateway corresponds to the second pre-configuration rule, and the GSLB corresponds to the third pre-configuration rule, that is, the UPF may be enabled to resolve the DNS request.

If the request type of the domain name request is a DNS request, and in this case the UPF has resolved the DNS request and forwarded the request to the edge cloud gateway, then the edge cloud gateway only needs to directly re-encapsulate the resolved domain name request into a second HTTP DNS request and transmit the second HTTP DNS request to the GSLB. If the request type of the domain name request is a first HTTP DNS request, the edge cloud gateway may change the source address in the domain name request to the IP address of the edge cloud gateway to obtain the second HTTP DNS request and forward the second HTTP DNS request to the GSLB.

In the second implementation: The UPF corresponds to the fourth pre-configuration rule, the edge cloud gateway corresponds to the fifth pre-configuration rule, and the GSLB corresponds to the third pre-configuration rule, that is, the edge cloud gateway may be enabled to resolve the DNS request.

If the request type of the domain name request is a DNS request, the edge cloud gateway resolves the domain name request to obtain a domain name in the domain name request, re-encapsulates the resolved domain name request into a second HTTP DNS request, and transmits the re-encapsulated second HTTP DNS request to the GSLB. If the request type of the domain name request is a first HTTP DNS request, the edge cloud gateway may change the source address in the domain name request, to obtain the second HTTP DNS request, and forward the second HTTP DNS request to the GSLB.

S2: Receive a first HTTP DNS response to the second HTTP DNS request returned by the GSLB, the first HTTP DNS response including at least the edge-application VIP, the edge-application VIP being determined by the GSLB according to the IP address of the edge cloud gateway and the service acceleration domain name.

Step 320: Return a domain name response to a terminal by using the UPF, the domain name response including at least the edge-application VIP.

There may be two cases when step 320 is performed:

In the first case: A DNS response is returned when the request type of the domain name request is the DNS request.

In the second case: A second HTTP DNS response is returned when the request type of the domain name request is the first HTTP DNS request.

Step 330: Receive a service request forwarded by the UPF, a destination address of the service request being the edge-application VIP.

In this way, the UPF pre-configures this rule in both the first pre-configuration rule and the fourth pre-configuration rule thereof, that is, the service request in which the destination address is the edge-application VIP is forwarded to the edge cloud gateway.

Step 340: Determine a corresponding MEC processing server according to the service request and a preset offloading policy, and offload the service request to the corresponding MEC processing server.

In the embodiments of this disclosure, an edge cloud gateway is added, compatibility with DNS and HTTP DNS addressing scenarios is achieved, a domain name request of a terminal is forwarded to the edge cloud gateway, and is processed by the edge cloud gateway, and finally, a service request of the terminal is offloaded to a corresponding MEC processing server, so that a mechanism for selecting a MEC node is implemented, and the problem of absence of a MEC node selection solution for a 5G mobile communication networks is resolved.

Based on the foregoing embodiment, specific application scenarios are used for description below. For different pre-configuration rules of the UPF and the edge cloud gateway, two different implementations are adopted below to illustrate the method for selecting a MEC node in this embodiment of this disclosure.

Figure 4:
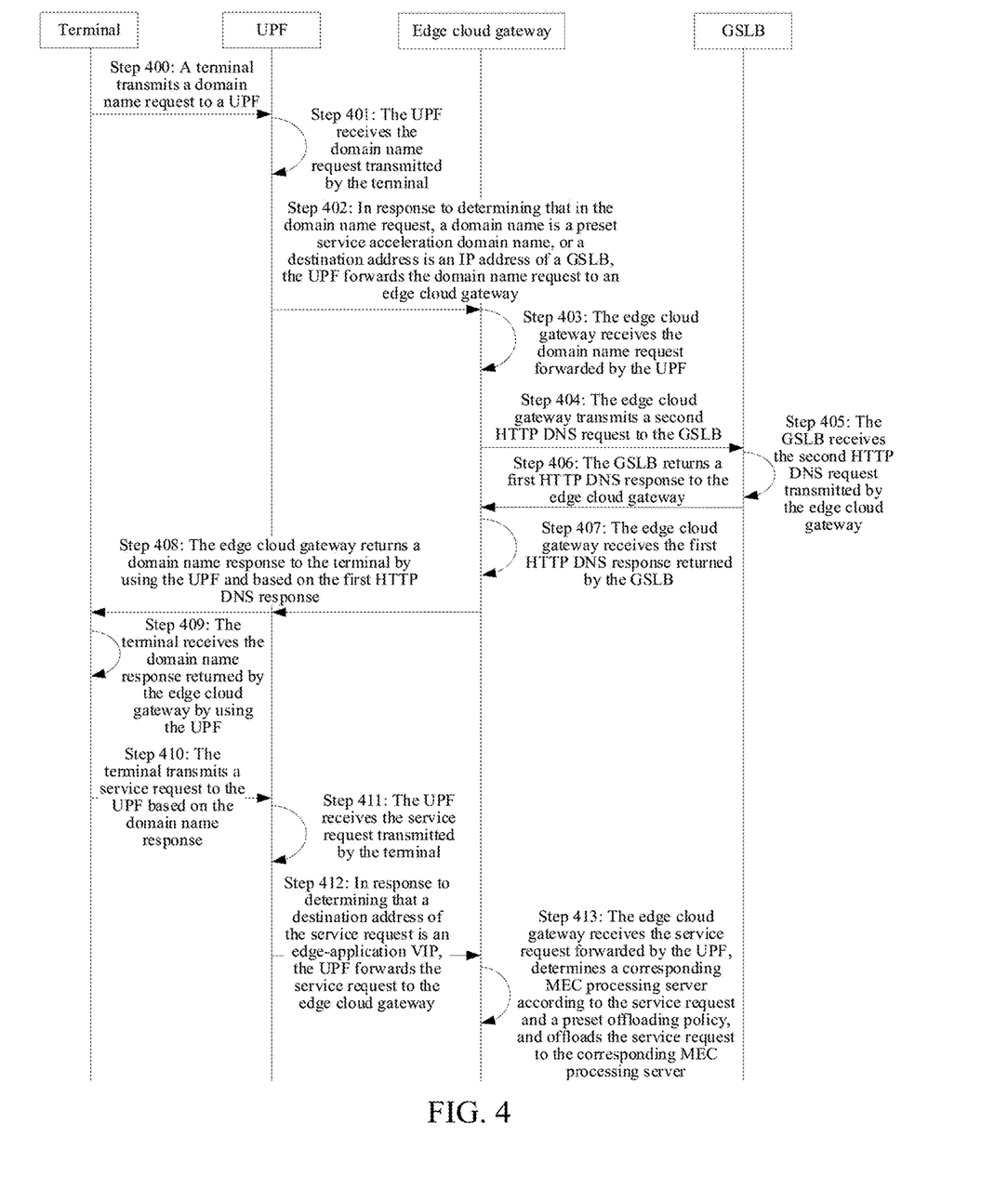
FIG. 4 is an interactive flowchart of a method for selecting a MEC node according to an embodiment of this disclosure.

In the first implementation: The UPF corresponds to the first pre-configuration rule, the edge cloud gateway corresponds to the second pre-configuration rule. This is a scenario in which the UPF resolves the DNS request.

FIG. 4 is an interactive flowchart of a method for selecting a MEC node according to an embodiment of this disclosure.

Step 400: A terminal transmits a domain name request to a UPF.

Specifically, the terminal can initiate a request for an original domain name by using a standard DNS or an HTTP DNS, that is, based on a conventional DNS or HTTP DNS addressing mechanism.

The request type of the domain name request is a DNS request (i.e., a standard DNS request) or a first HTTP DNS request.

Step 401: The UPF receives the domain name request transmitted by the terminal.

Step 402: In response to determining that in the domain name request, a domain name is a preset service acceleration domain name, or a destination address in the domain name request is an IP address of a GSLB, the UPF forwards the domain name request to an edge cloud gateway.

In an embodiment of this disclosure, a first pre-configuration rule may be configured for the UPF, so that the UPF has a DNS request resolving capability. Based on the corresponding first pre-configuration rule, the UPF may, for a domain name request of which a request type is a DNS request, resolve the DNS request, and determine whether a domain name in the DNS request is a domain name that requires service acceleration, and may, for a domain name request of which a request type is a first HTTP DNS request, check a destination address, determine that service acceleration is required if the destination address is the IP address of the GSLB, and forwards the domain name request to the edge cloud gateway.

Step 403: The edge cloud gateway receives the domain name request forwarded by the UPF.

Step 404: The edge cloud gateway transmits a second HTTP DNS request to the GSLB.

The second HTTP DNS request includes at least a service acceleration domain name, a source address, or a destination address, the source address being an IP address of the edge cloud gateway, and the destination address being an IP address of the GSLB.

Further, the edge cloud gateway records the request type of the domain name request.

That is, the edge cloud gateway initiates a second HTTP DNS request to the GSLB by using an IP address thereof as the source address. In this way, for a domain name request of which a request type is a DNS request, the original DNS request can be converted into a second HTTP DNS request by using the edge cloud gateway. When being transmitted again, the second HTTP DNS request can bypass a local DNS and be transmitted directly to the GSLB, which simplifies an access procedure. For a domain name request of which a request type is a first HTTP DNS request, the edge cloud gateway changes a source address to an IP address thereof and transmits a second HTTP DNS request to the GSLB, so that the GSLB may correspondingly return an edge-application VIP for service acceleration when the GSLB determines, according to the source address, that the source address is the IP address of the edge cloud gateway.

Step 405: The GSLB receives the second HTTP DNS request transmitted by the edge cloud gateway.

Step 406: The GSLB returns a first HTTP DNS response to the edge cloud gateway.

The first HTTP DNS response includes at least the edge-application VIP, the edge-application VIP being determined by the GSLB according to the IP address of the edge cloud gateway and the service acceleration domain name.

In this embodiment of this disclosure, this step can be implemented by the GSLB based on the corresponding third pre-configuration rule. If the GSLB determines that in the second HTTP DNS request, a source address is the IP address of the edge cloud gateway, and a domain name of the request is a service acceleration domain name, an actual edge-application VIP can be selected and returned back according to the IP address of the edge cloud gateway and a service configuration corresponding to the service acceleration domain name.

Step 407: The edge cloud gateway receives the first HTTP DNS response returned by the GSLB.

Step 408: The edge cloud gateway returns a domain name response to a terminal by using the UPF and based on the first HTTP DNS response.

The domain name response includes at least the edge-application VIP.

Specifically, there may be two cases:

1) A DNS response is returned when the request type of the domain name request is the DNS request.

2) A second HTTP DNS response is returned when the request type of the domain name request is the first HTTP DNS request.

Step 409: The terminal receives the domain name response returned by the edge cloud gateway by using the UPF.

Step 410: The terminal transmits a service request to the UPF based on the domain name response.

Specifically, after receiving the domain name response, the terminal may initiate a service request by using the edge-application VIP in the domain name response as a destination address, where the destination address in the service request is the edge-application VIP.

Step 411: The UPF receives the service request transmitted by the terminal.

Step 412: In response to determining that the destination address of the service request is the edge-application VIP, the UPF forwards the service request to the edge cloud gateway.

This is implemented by the UPF based on the corresponding first pre-configuration rule or the fourth pre-configuration rule, and the service request in which the destination address is the edge-application VIP is forwarded to the edge cloud gateway.

Step 413: The edge cloud gateway receives the service request forwarded by the UPF, determines a corresponding MEC processing server according to the service request and a preset offloading policy, and offloads the service request to the corresponding MEC processing server.

In this way, in this embodiment of this disclosure, a service data procedure for selecting a MEC node is provided mainly for a 5G mobile communication network. The UPF is configured to have a DNS request resolving capability. By using devices such as the edge cloud gateway, the UPF can be applied to a DNS addressing or HTTP DNS addressing scenario of the terminal, and a service can be offloaded to a nearest MEC processing server with higher precision, so that a MEC node can be selected, to reduce latency, thereby achieving service acceleration.

Figure 5:
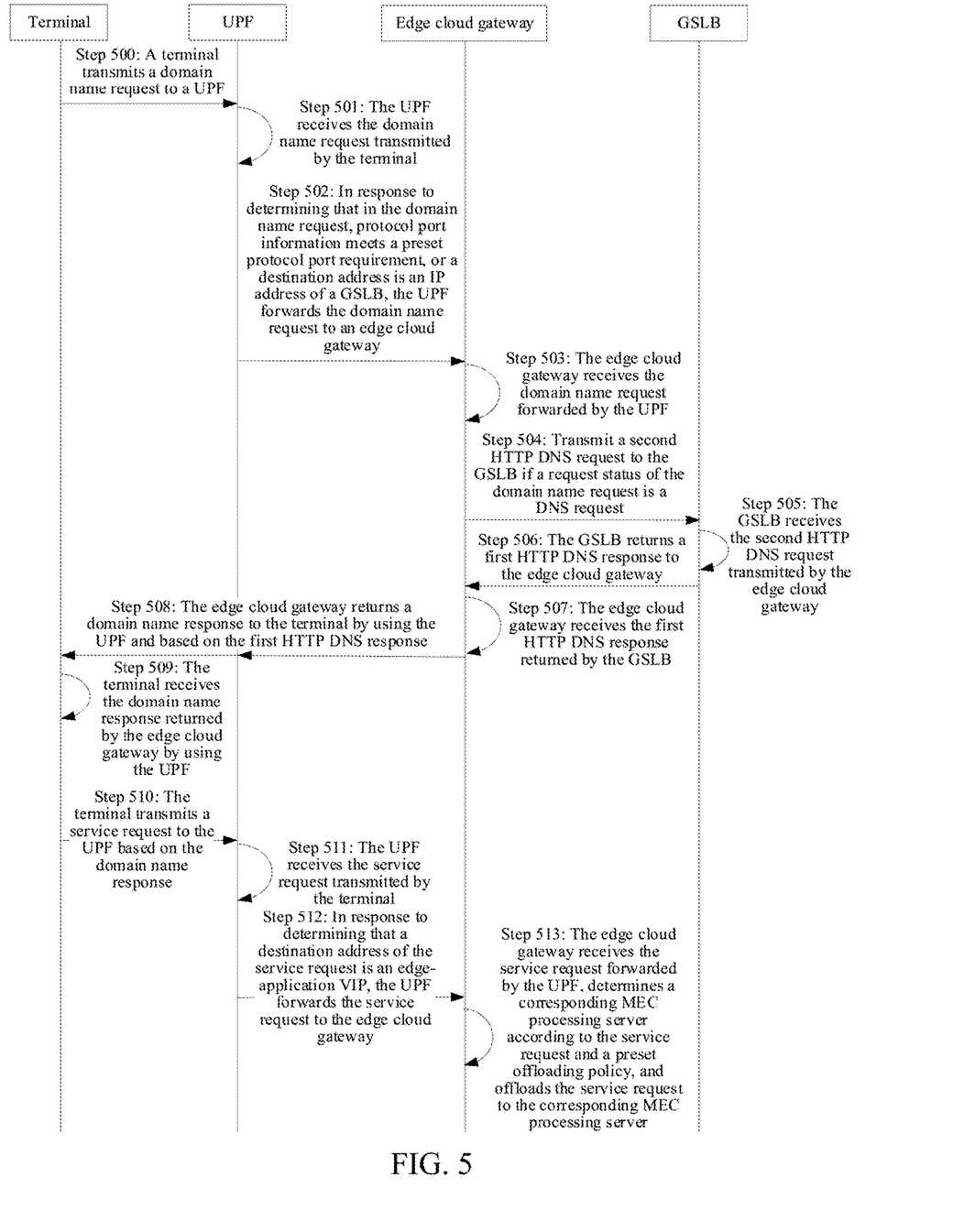
FIG. 5 is an interactive flowchart of another method for selecting a MEC node according to an embodiment of this disclosure.

In the second implementation: The UPF corresponds to the fourth pre-configuration rule, the edge cloud gateway corresponds to the fifth pre-configuration rule, that is, a scenario in which the edge cloud gateway resolves the DNS request.

FIG. 5 is an interactive flowchart of a method for selecting a MEC node according to an embodiment of this disclosure.

Step 500: A terminal transmits a domain name request to a UPF.

The request type of the domain name request is a DNS request or a first HTTP DNS request.

Step 501: The UPF receives the domain name request transmitted by the terminal.

Step 502: In response to determining that in the domain name request, protocol port information meets a preset protocol port requirement, or a destination address is an IP address of a GSLB, the UPF forwards the domain name request to an edge cloud gateway.

This step is implemented by the UPF based on the corresponding fourth pre-configuration rule.

In this embodiment of this disclosure, the fourth pre-configuration rule may be configured for the UPF, so that the UPF does not resolve the DNS request. Based on the corresponding fourth pre-configuration rule, the UPF may check, for a domain name request of which a request type is a DNS request, protocol port information thereof, and if the check protocol port information meets a preset requirement, for example, the protocol port information is a UDP port 53, determine that the domain name request is a DNS request, and forward the domain name request to the edge cloud gateway, so that the edge cloud gateway can resolve the DNS request based on the corresponding fifth pre-configuration rule, and may check, for a domain name request of which a request type is a first HTTP DNS request, a destination address, and if the destination address is the IP address of the GSLB, determine that service acceleration is required, and forward the domain name request to the edge cloud gateway.

Step 503: The edge cloud gateway receives the domain name request forwarded by the UPF.

Step 504: Transmit a second HTTP DNS request to the GSLB if a request type of the domain name request is a DNS request.

If the request type of the domain name request is the DNS request, the edge cloud gateway resolves the domain name request to obtain a domain name, and re-encapsulates the resolved domain name request into a second HTTP DNS request.

The second HTTP DNS request includes at least a service acceleration domain name, a source address, and a destination address, the source address being an IP address of the edge cloud gateway, and the destination address being an IP address of the GSLB.

Further, the edge cloud gateway records the request type of the domain name request.

The fifth pre-configuration rule is correspondingly configured for the edge cloud gateway. In this embodiment of this disclosure, the edge cloud gateway is configured to have a DNS request resolving capability. If the request type of the domain name request is the DNS request, the edge cloud gateway resolves the domain name request to obtain a domain name in the domain name request, re-encapsulates the resolved domain name request into a second HTTP DNS request, and transmits the re-encapsulated second HTTP DNS request to the GSLB.

If the request type of the domain name request is the first HTTP DNS request, the edge cloud gateway encapsulates the domain name request by directly using the IP address thereof as a source address into a second HTTP DNS request, and forwards the second HTTP DNS request to the GSLB.

Step 505: The GSLB receives the second HTTP DNS request transmitted by the edge cloud gateway.

Step 506: The GSLB returns a first HTTP DNS response to the edge cloud gateway.

The first HTTP DNS response includes at least the edge-application VIP, the edge-application VIP being determined by the GSLB according to the IP address of the edge cloud gateway and the service acceleration domain name.

This can be implemented by the GSLB based on the corresponding third pre-configuration rule.

Step 507: The edge cloud gateway receives the first HTTP DNS response returned by the GSLB.

In this embodiment of this disclosure, in steps 504 and 507, the edge cloud gateway can be considered as a proxy for a conventional local DNS (LDNS), and has a function of the LDNS.

Step 508: The edge cloud gateway returns a domain name response to a terminal by using the UPF and based on the first HTTP DNS response.

The domain name response includes at least the edge-application VIP.

Specifically, there may be two cases:

1) A DNS response is returned when the request type of the domain name request is the DNS request.

2) A second HTTP DNS response is returned when the request type of the domain name request is the first HTTP DNS request.

Step 509: The terminal receives the domain name response returned by the edge cloud gateway by using the UPF.

Step 510: The terminal transmits a service request to the UPF based on the domain name response.

Specifically, after receiving the domain name response, the terminal may initiate a service request by using the edge-application VIP in the domain name response as a destination address, where the destination address in the service request is the edge-application VIP.

Step 511: The UPF receives the service request transmitted by the terminal.

Step 512: In response to determining that the destination address of the service request is the edge-application VIP, the UPF forwards the service request to the edge cloud gateway.

This is implemented by the UPF based on the corresponding first pre-configuration rule or the fourth pre-configuration rule, and the service request in which the destination address is the edge-application VIP is forwarded to the edge cloud gateway.

Step 513: The edge cloud gateway receives the service request forwarded by the UPF, determines a corresponding MEC processing server according to the service request and a preset offloading policy, and offloads the service request to the corresponding MEC processing server.

In this way, in this embodiment of this disclosure, a service data procedure for selecting a MEC node is provided for at least a 5G mobile communication network. The edge cloud gateway is configured to have a DNS request resolving capability. By using devices such as the edge cloud gateway, when a terminal initiate a DNS request based on a DNS addressing or HTTP DNS addressing, a nearby MEC node can be correctly selected, and a service can be offloaded to a nearest MEC processing server with higher location precision, thereby achieving edge acceleration and load balancing.

Figure 6:
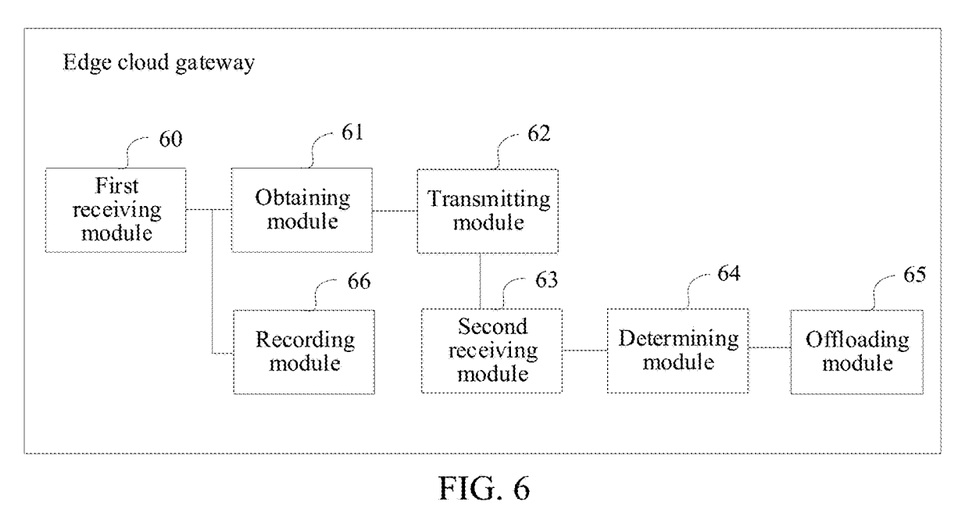
FIG. 6 is a schematic structural diagram of an apparatus for selecting a MEC node according to an embodiment of this disclosure.

Based on the foregoing embodiments, FIG. 6 shows an edge cloud gateway for selecting a MEC node according to an embodiment of this disclosure. The edge cloud gateway is configured in a system for selecting a MEC node. The system includes at least a UPF, the edge cloud gateway, and a GSLB. The edge cloud gateway specifically includes:

a first receiving module 60, configured to receive a domain name request forwarded by the UPF, in the domain name request, a domain name being a preset service acceleration domain name, or a destination address being an IP address of the GSLB, or protocol port information in the domain name request meeting a preset protocol port requirement;

an obtaining module 61, configured to obtain a corresponding edge-application VIP from the GSLB based on the domain name request;

a transmitting module 62, configured to return a domain name response to a terminal by using the UPF, the domain name response including at least the edge-application VIP;

a second receiving module 63, configured to receive a service request forwarded by the UPF, a destination address of the service request being the edge-application VIP;

a determining module 64, configured to determine a corresponding MEC processing server according to the service request and a preset offloading policy; and an offloading module 65, configured to offload the service request to the corresponding MEC processing server.

Optionally, a recording module 66 is further included, configured to record a request type of the domain name request, the request type representing a DNS request or a first HTTP DNS request.

Optionally, the obtaining module 61 is specifically configured to:

transmit a second HTTP DNS request to the GSLB based on the domain name request, the second HTTP DNS request including at least a service acceleration domain name, a source address, and a destination address, the source address being an IP address of the edge cloud gateway, and the destination address being an IP address of the GSLB; and receive a first HTTP DNS response returned by the GSLB, the first HTTP DNS response including at least the edge-application VIP, the edge-application VIP being determined by the GSLB according to the IP address of the edge cloud gateway and the service acceleration domain name.

Optionally, when in the domain name request, the protocol port information meets the preset protocol port requirement, or the destination address is the IP address of the GSLB, the obtaining module 61 is specifically configured to:

resolve, when the request type of the domain name request is the DNS request, the domain name request to obtain the domain name in the domain name request, and re-encapsulate the resolved domain name request into a second HTTP DNS request; and transmit the re-encapsulated second HTTP DNS request to the GSLB.

Optionally, the transmitting module 62 is specifically configured to:

return a DNS response when the request type of the domain name request is the DNS request; and return a second HTTP DNS response when the request type of the domain name request is the first HTTP DNS request.

Optionally, the UPF, the edge cloud gateway, and the GSLB respectively correspond to different pre-configuration rules, the pre-configuration rule representing a routing configuration for service acceleration.

Optionally, the UPF corresponds to a first pre-configuration rule, the first pre-configuration rule including at least: forwarding the domain name request in which the domain name is the preset service acceleration domain name to the edge cloud gateway; or forwarding the domain name request in which the destination address is the IP address of the GSLB to the edge cloud gateway; or forwarding the service request in which the destination address is the edge-application VIP to the edge cloud gateway.

The edge cloud gateway corresponds to a second pre-configuration rule, the second pre-configuration rule including at least: the preset offloading policy.

The GSLB corresponds to a third pre-configuration rule, the third pre-configuration rule including at least: for an HTTP DNS request in which a source address is the IP address of the edge cloud gateway, returning a corresponding edge-application VIP based on the IP address of the edge cloud gateway and a service acceleration domain name in the HTTP DNS request.

Optionally, the UPF corresponds to a fourth pre-configuration rule, the fourth pre-configuration rule including at least: forwarding the domain name request in which the protocol port information meets the preset protocol port requirement to the edge cloud gateway; or forwarding the domain name request in which the destination address is the IP address of the GSLB to the edge cloud gateway; or forwarding the service request in which the destination address is the edge-application VIP to the edge cloud gateway.

The edge cloud gateway corresponds to a fifth pre-configuration rule, the fifth pre-configuration rule including at least: the preset offloading policy, and has a DNS request resolving capability.

Optionally, the first pre-configuration rule, the second pre-configuration rule, the fourth pre-configuration rule, or the fifth pre-configuration rule is configured by a configured edge controller or is locally configured, the edge controller being configured in a cloud center of a core network in the system, and being communicably connected to the edge cloud gateway and the UPF respectively.

Figure 7:
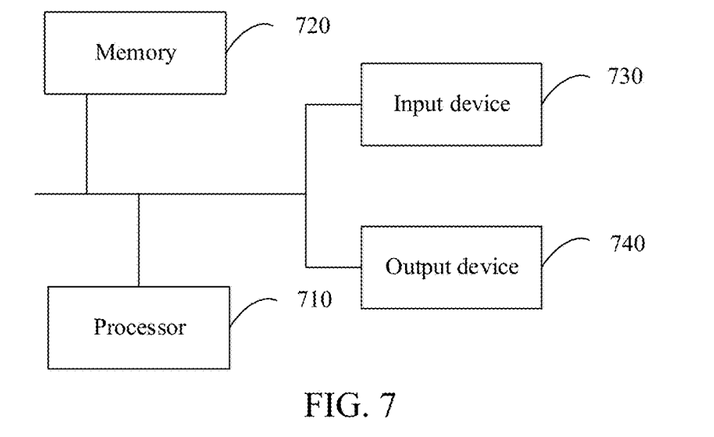
FIG. 7 is a schematic structural diagram of an electronic device according to an embodiment of this disclosure.

Based on the foregoing embodiments, FIG. 7 is a schematic structural diagram of an electronic device according to an embodiment of this disclosure.

This embodiment of this disclosure provides an electronic device. The electronic device may include a center processing unit (CPU) 710, a memory 720, an input device 730, an output device 740, and the like. The input device 730 may include a keyboard, a mouse, a touch screen, and the like. The output device 740 may include a display device, such as a liquid crystal display (LCD) or a cathode ray tube (CRT).

The memory 720 may include a read-only memory (ROM) and a random access memory (RAM), and provide program instructions and data stored in the memory 720 for the processor 710. In this embodiment of this disclosure, the memory 720 may be configured to store a program of the method for selecting a MEC node according to any one of the embodiments of this disclosure.

The processor 710 invokes the program instructions stored in the memory 720, and the processor 710 is configured to perform, according to the obtained program instructions, the method for selecting a MEC node according to any one of the embodiments of this disclosure.

Based on the foregoing embodiments, an embodiment of this disclosure provides a non-transitory computer-readable storage medium, storing a computer program, the computer program, when executed by a processor, implementing the method for selecting a MEC node according to any one of the method embodiments described above.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

A person skilled in the art can understand that the embodiments of this disclosure may be provided as a method, a system, or a computer program product. Therefore, this application may use a form of hardware-only embodiments, software-only embodiments, or embodiments combining software and hardware. Moreover, this application may use a form of a computer program product that is implemented on one or more computer-usable storage media (including but not limited to a disk memory, a CD-ROM, an optical memory, and the like) that include computer-usable program code.

In an exemplary embodiment, a computer program product is further provided, when executed, the computer program product is configured to implement the method for selecting a MEC node provided in the foregoing embodiments.

This application is described with reference to flowcharts and/or block diagrams of the method, the device (system), and the computer program product according to the embodiments of this disclosure. It is to be understood that computer program instructions can implement each procedure and/or block in the flowcharts and/or block diagrams and a combination of procedures and/or blocks in the flowcharts and/or block diagrams. The computer program instructions may be provided to an apparatus configured with a processor. When the processor executes the computer program instructions, the apparatus is configured to implement functions specified in one or more procedures in the flowcharts and/or one or more blocks in the block diagrams.

The computer program instructions may be alternatively stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may further be loaded onto a computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

Although exemplary embodiments of this disclosure have been described, once a person skilled in the art learns of the basic creative concept, additional changes and modifications can made to the embodiments. Therefore, the following claims are intended to be construed as to cover the exemplary embodiments and all changes and modifications falling within the scope of this application.

Obviously, a person skilled in the art can make various modifications and variations to the embodiments of this disclosure without departing from the spirit and scope of the embodiments of this disclosure. In this case, if the modifications and variations made to the embodiments of this disclosure fall within the scope of the claims of this application and equivalent technologies thereof, this application also intends to include the changes and variations.

What is claimed is:

1. A method for selecting a mobile edge computing (MEC) node, performed by an edge cloud gateway, the edge cloud gateway being configured in a system for selecting a MEC node, the system comprising at least a user plane function (UPF), the edge cloud gateway, and a global server load balance (GSLB), the method comprising:
   receiving a domain name request initiated by a terminal forwarded by the UPF, the domain name request comprising at least one of: a domain name, a destination address, or a protocol port information, the domain name being a preset service acceleration domain name, the destination address being an Internet Protocol (IP) address of the GSLB, the protocol port information satisfying a preset protocol port requirement;
   obtaining a corresponding edge-application virtual Internet Protocol address (VIPA, or VIP) from the GSLB based on the domain name request;
   returning a domain name response to the terminal by using the UPF, the domain name response comprising the edge-application VIP;
   receiving a service request initiated from the terminal forwarded by the UPF, a destination address of the service request being the edge-application VIP; and
   determining a corresponding MEC processing server according to the service request and a preset offloading policy, and offloading the service request to the corresponding MEC processing server.

2. The method according to claim 1, further comprising:
   recording a request type of the domain name request, the request type representing a Domain Name System (DNS) request or a first Hypertext Transfer Protocol (HTTP) DNS request.

3. The method according to claim 2, wherein obtaining the corresponding edge-application VIP from the GSLB based on the domain name request comprises:
   transmitting a second HTTP DNS request to the GSLB based on the domain name request, the second HTTP DNS request comprising at least one of: a service acceleration domain name, a source address, or a destination address, the source address being an IP address of the edge cloud gateway, and the destination address being an IP address of the GSLB; and
   receiving a first HTTP DNS response to the second HTTP DNS request returned by the GSLB, the first HTTP DNS response comprising the edge-application VIP, the edge-application VIP being determined by the GSLB according to the IP address of the edge cloud gateway and the service acceleration domain name.

4. The method according to claim 3, wherein:
the domain name request comprises at least one of: the destination address, or the protocol port information; and
transmitting the second HTTP DNS request to the GSLB based on the domain name request comprises:
in response to the request type of the domain name request being the DNS request, resolving the domain name request to obtain the domain name in the domain name request, and re-encapsulating the resolved domain name request into the second HTTP DNS request; and
transmitting the second HTTP DNS request to the GSLB.

5. The method according to claim 2, wherein returning the domain name response to the terminal by using the UPF comprises:
returning a DNS response in response to the request type of the domain name request being the DNS request; or
returning a second HTTP DNS response in response to the request type of the domain name request being the first HTTP DNS request.

6. The method according to claim 1, wherein the UPF, the edge cloud gateway, and the GSLB respectively correspond to different pre-configuration rules, the pre-configuration rules representing a routing configuration for service acceleration.

7. The method according to claim 6, wherein:
the UPF corresponds to a first pre-configuration rule, the first pre-configuration rule comprising at least one of: forwarding the domain name request in which the domain name is the preset service acceleration domain name to the edge cloud gateway; forwarding the domain name request in which the destination address is the IP address of the GSLB to the edge cloud gateway; or forwarding the service request in which the destination address is the edge-application VIP to the edge cloud gateway;
the edge cloud gateway corresponds to a second pre-configuration rule, the second pre-configuration rule comprising the preset offloading policy; and
the GSLB corresponds to a third pre-configuration rule, the third pre-configuration rule comprising: for an HTTP DNS request in which a source address is the IP address of the edge cloud gateway, returning a corresponding edge-application VIP based on the IP address of the edge cloud gateway and a service acceleration domain name in the HTTP DNS request.

8. The method according to claim 7, wherein:
the first pre-configuration rule, or the second pre-configuration rule is configured by a configured edge controller or is locally configured; and
the edge controller is configured in a cloud center of a core network in the system, and is connected to the edge cloud gateway and the UPF.

9. The method according to claim 6, wherein:
the UPF corresponds to a fourth pre-configuration rule, the fourth pre-configuration rule comprising at least one of: forwarding the domain name request in which the protocol port information meets the preset protocol port requirement to the edge cloud gateway; forwarding the domain name request in which the destination address is the IP address of the GSLB to the edge cloud gateway; or forwarding the service request in which the destination address is the edge-application VIP to the edge cloud gateway; and
the edge cloud gateway corresponds to a fifth pre-configuration rule, the fifth pre-configuration rule comprising the preset offloading policy, and the edge cloud gateway has a DNS request resolving capability.

10. The method according to claim 9, wherein the fourth pre-configuration rule, or the fifth pre-configuration rule is configured by a configured edge controller or is locally configured.

11. The method according to claim 1, wherein the edge cloud gateway is configured on the MEC node or an edge data center (DC) of the system.

12. A device for selecting a MEC node, the device comprising:
a memory storing instructions; and
a processor in communication with the memory, wherein, when the processor executes the instructions, the processor is configured to cause the device to:
receive a domain name request initiated by a terminal forwarded by a UPF in a system, the domain name request comprising at least one of: a domain name, a destination address, or a protocol port information, the domain name being a preset service acceleration domain name, the destination address being an Internet Protocol (IP) address of a GSLB in the system, the protocol port information satisfying a preset protocol port requirement;
obtain a corresponding edge-application VIP from the GSLB based on the domain name request;
return a domain name response to the terminal by using the UPF, the domain name response comprising the edge-application VIP;
receive a service request initiated from the terminal forwarded by the UPF, a destination address of the service request being the edge-application VIP; and
determine a corresponding MEC processing server according to the service request and a preset offloading policy, and offloading the service request to the corresponding MEC processing server.

13. The device according to claim 12, wherein, when the processor executes the instructions, the processor is configured to further cause the device to:
record a request type of the domain name request, the request type representing a DNS request or a first HTTP DNS request.

14. The device according to claim 13, wherein, when the processor is configured to cause the edge cloud gateway to obtain the corresponding edge-application VIP from the GSLB based on the domain name request, the processor is configured to cause the device to:
transmit a second HTTP DNS request to the GSLB based on the domain name request, the second HTTP DNS request comprising at least one of: a service acceleration domain name, a source address, or a destination address, the source address being an IP address of the edge cloud gateway, and the destination address being an IP address of the GSLB; and
receive a first HTTP DNS response to the second HTTP DNS request returned by the GSLB, the first HTTP DNS response comprising the edge-application VIP, the edge-application VIP being determined by the GSLB according to the IP address of the edge cloud gateway and the service acceleration domain name.

15. The device according to claim 14, wherein:
the domain name request comprises at least one of: the destination address, or the protocol port information; and when the processor is configured to cause the device to transmit the second HTTP DNS request to the GSLB based on the domain name request, the processor is configured to cause the device to:
  in response to the request type of the domain name request being the DNS request, resolve the domain name request to obtain the domain name in the domain name request, and re-encapsulate the resolved domain name request into the second HTTP DNS request; and
  transmit the second HTTP DNS request to the GSLB.

16. The device according to claim 13, wherein, when the processor is configured to cause the device to return the domain name response to the terminal by using the UPF, the processor is configured to cause the device to:
  return a DNS response in response to the request type of the domain name request being the DNS request; or
  return a second HTTP DNS response in response to the request type of the domain name request being the first HTTP DNS request.

17. The device according to claim 12, wherein the UPF, the device, and the GSLB respectively correspond to different pre-configuration rules, the pre-configuration rules representing a routing configuration for service acceleration.

18. The device according to claim 17, wherein:
the UPF corresponds to a first pre-configuration rule, the first pre-configuration rule comprising at least one of: forwarding the domain name request in which the domain name is the preset service acceleration domain name to the device; forwarding the domain name request in which the destination address is the IP address of the GSLB to the device; or forwarding the service request in which the destination address is the edge-application VIP to the device;

the device corresponds to a second pre-configuration rule, the second pre-configuration rule comprising the preset offloading policy; and the GSLB corresponds to a third pre-configuration rule, the third pre-configuration rule comprising: for an HTTP DNS request in which a source address is the IP address of the device, returning a corresponding edge-application VIP based on the IP address of the device and a service acceleration domain name in the HTTP DNS request.

19. The device according to claim 18, wherein:
the first pre-configuration rule, or the second pre-configuration rule is configured by a configured edge controller or is locally configured; and the edge controller is configured in a cloud center of a core network in the system, and is connected to the device and the UPF.

20. A non-transitory storage medium for storing computer readable instructions, the computer readable instructions, when executed by a processor, causing the processor to:
  receive a domain name request initiated by a terminal forwarded by a UPF in a system, the domain name request comprising at least one of: a domain name, a destination address, or a protocol port information, the domain name being a preset service acceleration domain name, the destination address being an Internet Protocol (IP) address of a GSLB in the system, the protocol port information satisfying a preset protocol port requirement;
  obtain a corresponding edge-application virtual Internet Protocol address (VIPA, or VIP) from the GSLB based on the domain name request;
  return a domain name response to the terminal by using the UPF, the domain name response comprising the edge-application VIP;
  receive a service request initiated from the terminal forwarded by the UPF, a destination address of the service request being the edge-application VIP; and
  determine a corresponding MEC processing server according to the service request and a preset offloading policy, and offloading the service request to the corresponding MEC processing server.

* * * * *